United States Patent

Choy et al.

Patent Number: 6,032,040
Date of Patent: *Feb. 29, 2000

[54] METHOD AND SYSTEM FOR AUTORECONNECT OF WIRELESS CALLS

[75] Inventors: Vincent H. Choy, Hazlet; Veda Gundanna, Matawan, both of N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/788,753

[22] Filed: Jan. 24, 1997

[51] Int. Cl.[7] .................................................. H04Q 7/20
[52] U.S. Cl. ............................ 455/414; 455/403; 455/422
[58] Field of Search .................................. 455/403, 414, 455/416, 417, 422, 432, 436, 458, 459, 460, 560, 564, 31.3, 423, 424, 425, 67.1

[56] References Cited

U.S. PATENT DOCUMENTS

| | | | |
|---|---|---|---|
| 5,307,399 | 4/1994 | Dai et al. | 455/31.3 |
| 5,311,570 | 5/1994 | Grimes et al. | 455/31.3 |
| 5,566,225 | 10/1996 | Haas | 455/423 |
| 5,566,236 | 10/1996 | MeLampy et al. | 455/560 |
| 5,574,774 | 11/1996 | Ahlberg et al. | 455/560 |
| 5,752,185 | 5/1998 | Ahuja | 455/414 |

*Primary Examiner*—Dwayne D. Bost
*Assistant Examiner*—Nay Maung
*Attorney, Agent, or Firm*—Gibbons, Del Deo, Dolan, Griffinger & Vecchione

[57] ABSTRACT

A method, apparatus and system for automatically reconnecting wireless call(s) to a wireless terminal user when a communications link carrying the call is disconnected. In one illustrative embodiment, the wireless communications system maintains and updates call information associated with the wireless terminal when the communications link between the wireless communications system and the wireless terminal is disconnected. The present invention then automatically determines whether the wireless terminal is available for communications in the wireless communications system. If the wireless terminal is available, then the wireless communications system reestablishes communications between the wireless terminal and all other parties on all calls, and restores the updated call information associated with all calls at the wireless terminal.

39 Claims, 3 Drawing Sheets

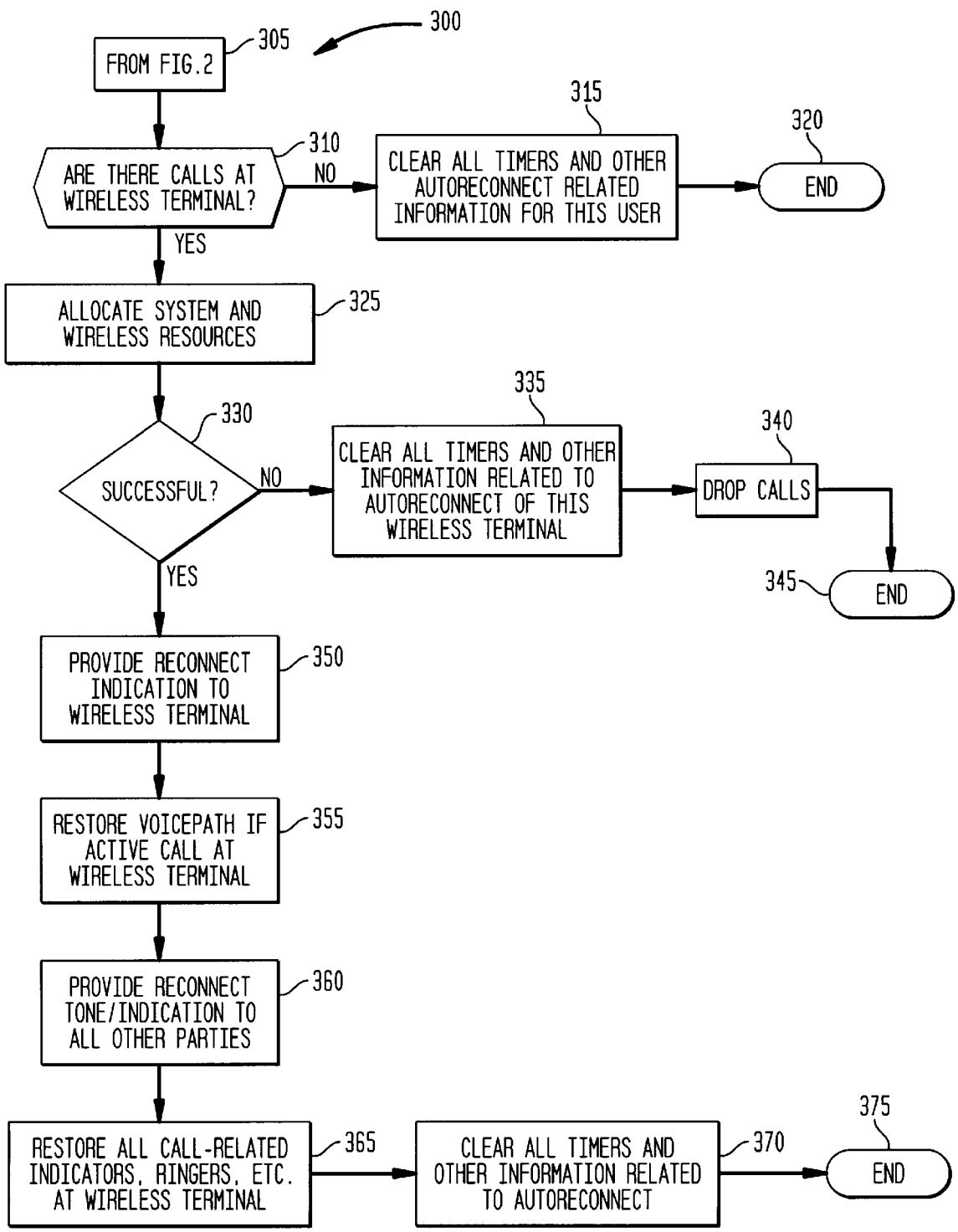

METHOD AND SYSTEM FOR AUTORECONNECT OF WIRELESS CALLS

FIELD OF THE INVENTION

The present invention relates generally to the field of telecommunications, and more particularly to wireless communications systems.

BACKGROUND OF THE INVENTION

A wireless terminal communicates to another party through a wireless communications system ("WCS"), which generally consists of a switch, and one or more base stations. The switch provides switching services for both wired as well as wireless users, and can be a Private Branch Exchange ("PBX"), Local Exchange Carrier ("LEC") or an Interexchange Carrier ("IXC") or any combination thereof. The base station is a wireless base controller, which has wired connection to the switch, and has one or more antenna to provide wireless connectivity to wireless terminals. A cell represents the coverage area provided by the antenna. The wireless terminal can be a single line or multi-line portable wireless telecommunications equipment that is connected to the WCS. A typical WCS consists of several cells that are adjacent, and are to a certain extent overlapping. A wireless terminal is associated with (or location registered to) the WCS through a particular cell in the WCS at any given time, where location registration is the procedure by which the wireless terminal informs the fixed part of the WCS its location within the system.

Mobility to a wireless terminal user is provided by linking the wireless terminal to the new adjacent cell, and handing off the call from the previous cell to the new one, thus providing call continuity. However as detailed below, maintaining call continuity is a difficult process. In a wireless environment it is difficult to define the boundaries of a cell and the associated coverage area. As a result, wireless installations can not provide total and perfect coverage. Gaps or holes in any system's wireless coverage is a very common phenomenon. In addition, a variety of interferences (both temporary and permanent) can arise which will affect wireless connectivity, including metal barriers or obstructions to wireless transmissions, interference by other wireless systems in the same coverage area, etc. Interferences caused by temporary obstructions are quite unpredictable. As such, existing handover mechanisms are not capable of providing call continuity in all of these circumstances.

The following are examples of scenarios in a wireless telecommunications environment where call continuity can not be provided by present handover mechanisms: 1) when the wireless terminal user temporarily moves out of the system's coverage area and then moves back in; 2) when the wireless terminal user moves between unsynchronized cell clusters within the system (as is common in a campus-like environment, where there are several geographically scattered buildings and it is expensive as well as difficult to provide contiguous or uninterrupted and synchronous coverage); and 3) when the wireless terminal user who is on a call experiences low battery power, and would like to replace it without having to disconnect the call.

In the scenarios described above or any other similar problem scenarios, handover of wireless calls will not happen since such a handover requires synchronized cells that provide total coverage throughout the system, without any interferences or gaps in the coverage and continuous/ uninterrupted association of the wireless terminal with the WCS for the whole duration of a call. The wireless terminal user active on a call will experience some noises, pops and clicks, etc. due to a weak wireless connection, and eventually will lose link with the WCS. The WCS will get a message or an indication that it has lost the link with the wireless terminal. Since calls can not be recovered through handover, the WCS will drop the calls. As such, the wireless terminal user will have to manually re-establish a new call.

An existing procedure for re-establishing calls to wireless terminal users where handovers can not happen is termed automatic call back ("ACB"). In accordance with this procedure, when a wireless terminal, which has established a communication path with another party loses sync with the system, the call gets dropped at both parties on the call, but the call-related information is preserved by the system. When the wireless terminal user re-links with the system, the WCS places a new call to the wireless terminal first. When the wireless terminal user answers the call, the other party is alerted for the call. However, in this procedure both parties have to take some action to answer the call in order to re-establish the connection.

There are several major additional drawbacks with this approach. First, user action is involved at both ends of the call. That is, the procedure is not fully automated. The ACB procedure works only in a 2-party call scenario, and not in multi-party conference call scenarios. Furthermore, ACB requires that the wireless terminal be currently active on a call, to be reconnected (i.e., it does not reconnect a wireless terminal which has calls that are held, ringing, etc.). The ACB solution is limited to only one call at time, since it is a call-based reconnection and not a user-based reconnection where all calls at the wireless terminal are reconnected. Thus if there are multiple calls at a wireless terminal user, only the currently active call is restored, and all the other calls are dropped. Also, if two wireless terminals are connected to each other, both experience interference and both lose connection with the WCS, ACB will not be able to restore the call, since user action is required by both parties.

Accordingly, there is a need to provide a system, apparatus and method of automatically reconnecting all calls to a wireless terminal when a communications link carrying the call(s) is disconnected, without the limitations associated with the prior art.

SUMMARY OF THE INVENTION

The present invention is directed to a method, apparatus and system for providing automatic call reconnection between a wireless terminal and other party or parties when the communications link carrying the call(s) had been disconnected. The present invention provides call continuity to single-line or multi-line wireless terminal users who have multiple calls in various states, including wireless terminal users connected to multiple calls in a conference set-up, and wireless terminal users connected to mtiltiple users on different lines. The present system can reconnect a call in any of a number of stages, including active calls, calls on hold, calls ringing at the wireless terminal, calls ringing at destination points, calls in dialing phase and any combination of the above stages. The method, apparatus and system works in all problem scenarios without any of the above-mentioned limitations, even where handover mechanisms fail to provide call continuity, and ACB fails to provide call reestablishment. The other party(ies) can be wired or wireless stations associated with this WCS, or outside lines connected over the trunk.

The invention is particularly useful to WCS service providers, since the present approaches used in WCSs can not provide full mobility to all wireless terminal users throughout the entire system in large areas with pockets of coverage (as in a campus environment where it is not economical to provide total wireless coverage), and in scenarios where the interferences are unpredictable and not conducive to retaining a wireless connectivity. The approach handles scenarios involving multiple parties on a single call, it is available to multiple wireless terminal users simultaneously, it functions at the system level thereby allowing the wireless terminal to reconnect at any cell location, and system resources are not wasted while attempting to reconnect, thus allowing for optimal use of all system and wireless resources.

As stated previously, when a wireless terminal experiences interference, the wireless connection is weakened and eventually the wireless terminal loses link with the WCS. In accordance with the present invention, instead of dropping the call, the system will maintain and update all call information associated with the wireless terminal for a pre-defined duration. The system will release all system resources and wireless resources associated with the wireless terminal for optimal use of the resources. To any remaining parties, it will appear as though the disconnected party is muted out until the connection or link is reestablished.

The system will then automatically determine if the wireless terminal is available for communications with the WCS. This is either done by the wireless terminal reporting back to the WCS after disconnection through the location registration procedure, or by the WCS, which will periodically send a page to locate the wireless terminal as long as there are calls to be reconnected to the wireless terminal. If communications between the wireless terminal and the WCS is established before the expiration of the pre-defined period, and there are calls to be reconnected (for example, the other party(ies) have not abandoned the call(s) yet), then the system will automatically restore all calls and the previously stored and updated call information associated with the wireless terminal, including all applicable call-associated indicators, tones, ringers, displays, etc. That is, reconnection and restoration will occur without any user intervention. The wireless terminal user will get a reconnect indication in the form of a tone, ring, vibrator, etc., as will other party(ies) on the calls. The system will attempt this procedure for a given number of times and will eventually either reconnect the user or drop the calls. As a result, the WCS can provide an automatic reconnect of the wireless terminal without the need for the user and the destination user (if any) to take active steps in the reconnection procedure. Thus, the present invention overcomes the limitations associated with the prior art, since the reconnection (if any) is an user-based reconnection, and all calls at the wireless terminal will be connected irrespective of the state or stage of the call.

These and other features of the invention are described in more complete detail in the following detailed description of the invention when taken with the drawings. The scope of the invention, however, is limited only by the claims appended hereto.

BRIEF DESCRIPTION OF THE DRAWINGS

FIG. 3 is a functional flow diagram of the reconnect phase of the autoreconnect method of the present invention.

DETAILED DESCRIPTION

For clarity of explanation, the illustrative embodiment of the present invention is presented, in part, as comprising individual functional blocks. The functions represented by these blocks may be provided through the use of either shared or dedicated hardware, including, but not limited to, hardware capable of executing software.

Figure 1:
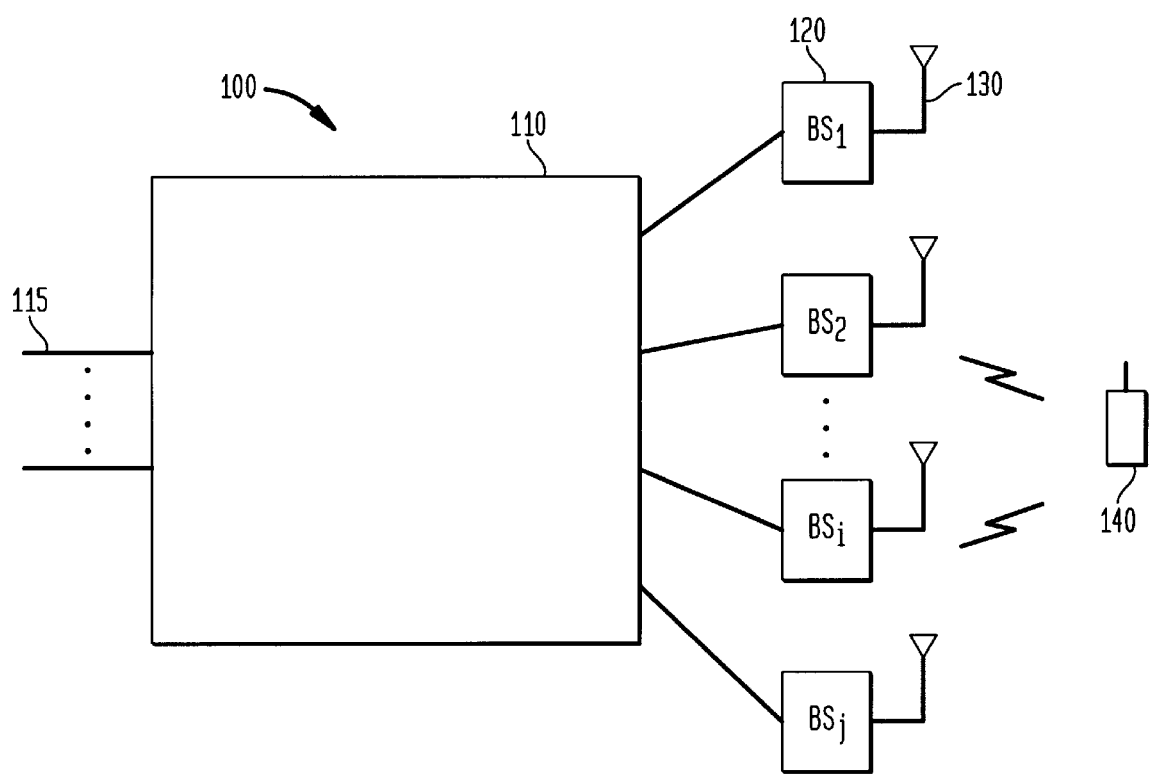
FIG. 1 is a block diagram of an illustrative embodiment of a wireless communications system.

Referring to FIG. 1, there is shown a wireless terminal 140, which communicates with other parties through a wireless communications system ("WCS"), which is indicated generally as 100. WCS 100 consists of a switch 110, and a base station 120. Switch 110 provides switching services for both wired stations 115 as well as wireless users, and can be a Private Branch Exchange ("PBX"), Local Exchange Carrier ("LEC") or an Interexchange Carrier ("IXC") or a combination thereof. This means that a destination user can be located at any point in the telecommunications network. Base station 120 is a wireless base station, which has wired connection to switch 110, and has one or more antenna 130 to provide wireless connectivity to wireless terminals 140. A cell represents the coverage area provided by antenna 130 of base station 120. Wireless terminal 140 can be a single line or multi-line portable wireless telecommunications equipment that is connected to WCS 100 through over-the-air communications protocols. As illustrated, WCS 100 consists of multiple base stations 120, which results in cells that are adjacent, and are to a certain extent overlapping. Wireless terminal 140 is associated with WCS 100 through a particular cell in WCS 100 at any given time. As mentioned previously current handover mechanisms are non-functional in certain problem scenarios, and if prior art procedures are operable, they require active participation by at least the wireless terminal user and also the destination user.

The present invention enables the WCS to provide automatic call reconnection and call continuity to single-line or multi-line wireless terminal users who have multiple calls in various states and stages, including wireless terminal users connected to multiple calls in a conference set-up, and wireless terminal users connected to multiple users on different lines. The implementation of the system can reside in any of the above-mentioned systems, or as an adjunct WCS connected to existing telecommunications systems. It is applicable to all the various wireless communications systems based on any standards such as cellular, analog, digital etc., operating in any established frequency ranges, and using any of the established wireless communications etiquette.

In an embodiment of the present invention, switch 110 performs all telecommunication and networking functions for all of its wired and wireless endpoints that can include voice stations, data terminals and trunks. Switch 110 also performs high level management of all system resources used in wired and wireless calls. Specifically with respect to the present invention, it handles the majority of the autoreconnect operations discussed herein. Base station 120 performs all wireless specific functions like paging a wireless terminal or maintaining a wireless link with the wireless terminal during a call or various mobility transactions. The autoreconnect function is essentially transparent to base station 120 in this embodiment. As a result, the autoreconnection of the wireless call(s) can occur anywhere in the system, and not necessarily with the base station from which the disconnection occurred.

Figure 2:
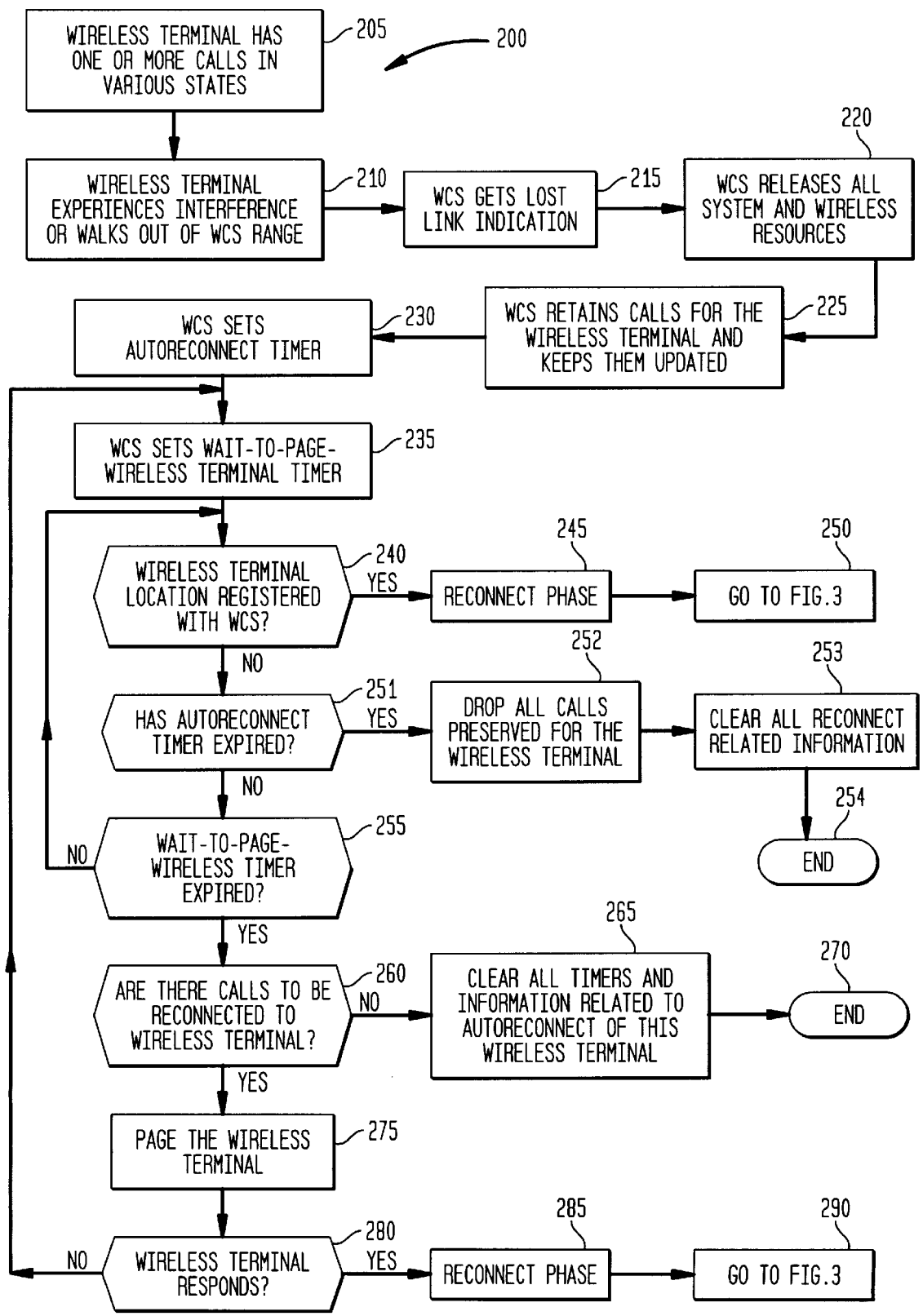
FIG. 2 is a functional flow diagram of the loss of link phase of the autoreconnect method of the present invention.

Referring now to FIG. 2 and FIG. 3, an autoreconnect method in accordance with the present invention is indicated generally as 200 and 300. It comprises a loss-of-link phase (FIG. 2), which is entered upon disconnecting from the WCS and a reconnect phase (FIG. 3), which is invoked when the wireless terminal is available for communications with the WCS. A wireless terminal user associated with a WCS, typically has one or more calls in various states, namely active calls, on-hold calls, ringing calls, destination ringing calls, user hearing dial tone state, in the middle of a dialing sequence and combinations thereof (block 205). Active calls are where the wireless terminal user is actively talking to (or engaged in conversation with) another party or multiple parties, as in a conference set-up (the call may involve a combination of wireless and wired communications equipment within the WCS or over the trunk). It may also refer to the transmission of data, as in a facsimile transmission. As such, a voice path or a data path is automatically restored when the wireless terminal is reconnected to the system. On-hold calls are, as the term implies, calls placed on hold by one of the users. Ringing calls are calls where the wireless terminal user has not yet answered the call. Destination ringing calls are where the wireless terminal user has placed a call to another user or users but the other party(ies) has (have) not yet answered the call (i.e., the wireless terminal user is still hearing the ringback tone). The remaining calls are self-explanatory. All such calls are eligible to be reoffered to the user when the wireless terminal is reconnected to the system.

When such a wireless terminal user experiences interference in the wireless connection or moves out of the range of the system, the user will recognize the fading, the noise and the interferences (pops and clicks, etc.) and may also get a warning tone in some cases. Eventually (usually a very short duration) the wireless terminal loses link with the system, and the WCS gets a message or an indication that it has lost the link with the wireless terminal (blocks 210 and 215). In response to losing the link with the wireless terminal, the WCS will release all the wireless and system resources associated with the particular wireless terminal so that they can be optimally used by the WCS for other purposes (block 220).

Next, the WCS retains all call information associated with the wireless terminal, as though the user is still in the system. In this sense, the term "call information associated with the wireless terminal (or the user thereof)" refers to any and all information required to restore the call(s) at the disconnected wireless terminal, and includes for instance active calls, on hold calls, etc. All calls for the user are retained at the system level (not on the base station or cell level). This gives the wireless terminal user the flexibility of moving back in to any cell anywhere in the system and get reconnected to the call(s). Note that since the calls are saved at the system level, if two wireless terminal users are on a call and both of them walk out of range, then each of the users can come back into the system and get reconnected independent of each other. That is, there is no requirement for user interaction in the method of the present invention. Call records are updated if there are any changes before reconnection occurs, such as changes due to actions by other parties of the call (block 225). Some examples are a ringing call being answered by the other party, or the other party dropping the call before the reconnection is complete. During the time that the wireless terminal user has lost link with the system, the other party(ies) in the connection feel as though the wireless terminal is muted. Note that if the other party(ies) has(ve) dropped any call(s), such call(s) will not be offered to the user (note blocks 260, 265 and 270; blocks 310, 315 and 320). The WCS will also set a autoreconnect timer (block 230), which can be set for any given duration and a wait-to-page-wireless-terminal-timer (block 235).

During this waiting period, a determination will be made as to the availability of the wireless terminal for communications with the WCS. In this sense, availability means that the wireless terminal is back within the coverage area of the WCS or that the interference has decreased such that communications with the WCS is possible (as for example, when a wireless terminal user is moving through heavy interference area, or between different buildings within the coverage areas of a WCS). Specifically, during the waiting-for-reconnect period, if the wireless terminal moves back within the coverage of the system, the wireless terminal can gain access to the system through pre-established location registration procedures (block 240). Simultaneously, during the same period, the WCS will also try to locate the wireless terminal by paging the wireless terminal periodically to check if it is back in the system (block 275). This occurs as long as there are calls to be reconnected to the wireless terminal. This ensures that there is a need to reconnect the calls and that the calls to the wireless terminal have not been disconnected by the other party(ies). If there are no calls to be reconnected, the WCS will stop the procedure and reset the timers (block 260–270).

As stated above, the WCS will first set a wait-to-page-wireless terminal timer (block 235). The WCS will then check if the wireless terminal has registered with the system (block 240). If the wireless terminal has registered with the system, then proceed to the reconnect phase (blocks 245, 250).

If the wireless terminal has not yet registered with the system, then the system will check if the autoreconnect timer has expired (block 251). If the autoreconnect timer has expired, then all call(s) preserved for the wireless terminal are dropped (block 252), and all call information associated with the wireless terminal is cleared (blocks 253 and 254). Otherwise, the system will check the status of the wait-to-page-wireless terminal timer (block 255). Note that if the wait-to-page-wireless terminal has not expired, it will return to block 240. If this timer has expired, then the WCS will determine if there are calls that need to be reconnected (block 260). If there are calls that need to be reconnected, the WCS will page the wireless terminal (block 275) and then check if the wireless terminal has responded to the page (block 280). If the wireless terminal has responded, then proceed to the reconnect phase (blocks 285, 290).

If the wireless terminal has not yet responded, then the WCS will repeat this process until the autoreconnect timer expires (block 251). Alternatively if there are no calls to be reconnected at block 260, the WCS will clear all timers and all calls previously saved by the WCS with respect to that wireless terminal (blocks 265 and 270). If the wireless terminal can not be located by the system within the autoreconnect time period, the WCS will receive a timeout message, and again all timers and calls will be cleared and canceled. The WCS may repeat the whole procedure a given number of times (depending on the system resources and limitations, and the need to provide call continuity) and eventually either reconnect the wireless terminal or drop the calls.

If at blocks 240 and 280, the wireless terminal is available for communications with the WCS, then the reconnect phase of the autoreconnect method is invoked (blocks 245–250 and 285–290, respectively).

Referring now to FIG. 3, the reconnect phase starts at block 305. If the WCS can establish communications with the wireless terminal before the wait-for-reconnect timer expires, the WCS may once again check if there are any calls that need to be reconnected or re-offered to the wireless terminal (block 310). If there are calls to be reconnected or re-offered to the wireless terminal user, the WCS allocates system and wireless resources for the wireless terminal (block 325). If the resources are available and the reconnection is successful, then the calls are automatically reconnected (blocks 330) and a reconnect indication is provided automatically to the wireless terminal (block 350). If the call to be restored at the wireless terminal is an active call, a voice path is automatically restored (block 355). If other party(ies) are involved in the call, an indication is provided automatically to such other party(ies) to indicate to them that the wireless terminal is back in the call (block 360). The reconnection indication can be a tone, ring, vibrator, music, display etc. The WCS also restores all applicable call-associated indicators such as status lamps/indicators, tones, ringers, displays, etc., to the wireless terminal without any user intervention (block 365). These can also include message waiting information, and other such information. The WCS will then clear all counters, flags and cancel all autoreconnection related timers, such as the autoreconnect timer and the waiting-to-page-wireless terminal timer (block 370 and 375).

If at blocks 310 and 330, there are either no calls to be reconnected or there are insufficient resources available, then the WCS clears all autoreconnect related information and drops the calls associated with the wireless terminal (blocks 315–320 and 335–345, respectively).

Thus the present invention overcomes, to a large extent, the limitations associated with the prior art and results in a system, apparatus and method which automatically reconnects a wireless terminal to the WCS without any user interaction and thereby provides automatic call continuity.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. A method for automatic reconnection of a communications link between a wireless terminal and a communications network with which said wireless terminal is in communication, responsive to a loss of said communication link, the method comprising the during an interval beginning with an initial establishment of said communications link between said wireless terminal and said communications network, for placing a call to a destination terminal served by said communications network, and ending with the establishment of a connection with said destination terminal via said communications link, detecting said loss of communications link between said wireless terminal and said communications network;

preserving call information associated with the wireless terminal, wherein said call information includes call-associated indicators;

reestablishing said communications link between said wireless terminal and said communications network; and restoring said call information associated with said wireless terminal.

2. The method according to claim 1, further including the step of updating said call information associated with the wireless terminal.

3. The method according to claim 1, wherein said step of preserving further includes the step of releasing system and wireless resources associated with the wireless terminal.

4. The method according to claim 1, wherein said step of reestablishing further includes the step of determining automatically whether the wireless terminal is available for communications in the wireless communications system.

5. The method according to claim 4, wherein said step of determining includes the step of initiating location registration by the wireless terminal.

6. The method according to claim 4, wherein said step of determining includes the step of sending a page to determine whether the wireless terminal is available for communications in the wireless communications system.

7. The method according to claim 1, wherein said step of restoring includes the steps of:

sending a reconnect indication to the wireless terminal; and, updating at least one call-associated indicator on the wireless terminal, wherein each said indicator conveys given information to the user.

8. The method according to claim 7, wherein said reconnect indication is selected form the group consisting of a ring, tone, vibration and display.

9. The method according to claim 7, wherein said step of restoring further includes the steps of:

reconnecting said call between said user and at least one destination user; and transmitting a reconnect indication to said destination user.

10. The method according to claim 1, wherein when said at least one call is an active call, said step of restoring includes the step of reinstating a path, wherein said path is selected from the group of a voice path and a data path.

11. The method according to claim 1, wherein when said at least one call is one selected from the group consisting of a on hold call, a ringing call, dialing a call, and a destination ringing call, said step of restoring includes the step of reoffering said call to the user.

12. The method according to claim 1, further comprising the step of dropping the call within a set duration unless the call is reconnected.

13. The method according to claim 1, wherein said call is disconnected from a first base station and said call is autoreconnected using a second base station.

14. The method according to claim 13, wherein said first base station and said second base station are the same.

15. The method according to claim 13, wherein said first base station and said second base station are different, said second base station being located anywhere in said system.

16. The method according to claim 1, wherein said step of restoring further includes the step of determining whether said call needs to be reconnected.

17. A wireless communication system comprising:

a processor operable to automatically reconnect a wireless terminal and a communications network served by said wireless communications system after detecting a loss of a communications link between said wireless terminal and said communications network, said loss occurring during an interval beginning with an initial establishment of said communications link between said wireless terminal and said communications network, for placing a call to a destination terminal served by said communications network, and ending with the establishing of a connection with said destination terminal via said communications link; and a storage medium for maintaining call information associated with said wireless terminal when said communications link is disconnected, wherein said call information includes call-associated indicators.

18. A wireless communication system as in claim 17, wherein said processor includes:

means for preserving said call information associated with said wireless terminal in said storage medium;

means for reestablishing a communications link between said wireless terminal and the wireless communications system if said wireless terminal is available to the wireless communications system; and means for restoring said call information associated with said wireless terminal.

19. The system according to claim 17, wherein said processor includes means for updating said call information associated with said wireless terminal.

20. The system according to claim 17, wherein said processor includes means for releasing system and wireless resources associated with said wireless terminal.

21. The system according to claim 17, wherein said processor includes:

means for restoring a path when said at least one call is an active call, said path being selected from the group of a voice path and a data path; and, means for reoffering a call to said user when said at least one call is one selected from the group consisting of a on hold call, a ringing call, dialing a call and a destination ringing call.

22. The system according to claim 17, wherein said processor includes:

means for determining automatically whether said wireless terminal is available for communications in the wireless communications system;

means for sending a reconnect indication to said wireless terminal; and, means for reestablishing at least one call-associated indicator on said wireless terminal, wherein each said indicator conveys given information to said user.

23. The system according to claim 17, wherein said processor is operable to drop the call within a set duration unless said call is reconnected.

24. The system according to claim 17, wherein said processor includes:

means for reconnecting said call between said user and at least one destination user; and means for transmitting a reconnect indication to said destination user.

25. The system according to claim 17, wherein said call is disconnected from a first base station and said call is autoreconnected with a second base station.

26. The system according to claim 25, wherein said first base station and said second base station are the same.

27. The system according to claim 25, wherein said first base station and said second base station are different, said second base station being located anywhere in said system.

28. The system according to claim 17, wherein said processor is operable to determine whether said call needs to be reconnected.

29. An apparatus for reconnecting a wireless terminal in a wireless communications system, said apparatus comprising:

a storage medium for retaining call information associated with said wireless terminal, wherein said call information includes call-associated indicators;

a processor being operable to automatically preserve said call information associated with said wireless terminal on said storage medium;

said processor being further operable to detect a loss of a communications link between said wireless terminal and a communications network served by said wireless communications system, said loss occurring during an interval beginning with an initial establishment of said communications link between said wireless terminal and said communications network, for placing a call to a destination terminal served by said communications network, and ending with the establishment of a connection with said destination terminal via said communications link;

said processor being operable to automatically reestablish said communications link between said wireless terminal and said communications network; and said processor being operable to automatically restore said call information associated with said wireless terminal from said storage medium to said wireless terminal.

30. The apparatus according to claim 29, wherein said processor is further operable to update said call information associated with said wireless terminal.

31. The apparatus according to claim 30, wherein said processor is further operable to release system and wireless resources associated with said wireless terminal.

32. The apparatus according to claim 31, wherein:

said processor is operable to restore a path when said at least one call is an active call, said path being selected from the group of a voice path and a data path; and said processor is operable to reoffer a call to said user when said at least one call is one selected from the group consisting of a on hold call, a ringing call, dialing a call and a destination ringing call.

33. The apparatus according to claim 29, wherein said processor is operable to reconnect said call between said user and at least one destination user, and further operable to transmit a reconnect indication to said destination user.

34. The apparatus according to claim 29, wherein said call is disconnected from a first base station and said call is autoreconnected with a second base station.

35. The apparatus according to claim 34, wherein said first base station and said second base station are the same.

36. The apparatus according to claim 34, wherein said first base station and said second base station are different, said second base station being located anywhere in said system.

37. The apparatus according to claim 29, wherein said processor is operable to determine whether said call needs to be reconnected.

38. The apparatus according to claim 29, wherein said processor is operable to send a reconnect indication to said wireless terminal.

39. The method of claim 1 wherein said communication link is characterized by a calling state and said loss of communication link occurs during a calling state selected from the group consisting of dialing, hearing ring back, and ringing calling states.

* * * * *